United States Patent
Menke et al.

(10) Patent No.: US 8,133,392 B2
(45) Date of Patent: Mar. 13, 2012

(54) THREE-PHASE CASCADE SEPARATOR

(75) Inventors: Lukas Menke, Munich (DE); Georgios Troubounis, Munich (DE); Ronald Mulder, Alkmaar (NL)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 12/894,592

(22) Filed: Sep. 30, 2010

(65) Prior Publication Data

US 2011/0048233 A1 Mar. 3, 2011

Related U.S. Application Data

(63) Continuation of application No. PCT/EP2009/003283, filed on May 8, 2009.

(30) Foreign Application Priority Data

Aug. 12, 2008 (DE) .......................... 10 2008 037 355

(51) Int. Cl.
*C02F 3/28* (2006.01)
*C02F 11/04* (2006.01)
*B01D 21/00* (2006.01)

(52) U.S. Cl. ........ 210/603; 210/928; 210/188; 210/521; 210/532.1

(58) Field of Classification Search .................. 210/603, 210/615, 616, 928, 188, 521, 532.1
See application file for complete search history.

(56) References Cited

U.S. PATENT DOCUMENTS

| 2,428,756 A | 10/1947 | Lind |
| 3,797,668 A | 3/1974 | Pielkenrood et al. |

(Continued)

FOREIGN PATENT DOCUMENTS

DE 1584862 12/1970

(Continued)

OTHER PUBLICATIONS

International Search Report of PCT/EP2009/003283 (3 pages), mailed Aug. 25, 2009.

*Primary Examiner* — Fred Prince
(74) *Attorney, Agent, or Firm* — Taylor IP, P.C.

(57) ABSTRACT

A three-phase separator for separating gas and solids from a three-phase mixture containing liquid, gas and solids includes an inlet region for the three-phase mixture, an outlet for a fraction rich in solids, an outlet for liquid, a first separator for separating gas from the three-phase mixture, forming a two-phase mixture which contains liquid and solids, and a second separator for separating solids from the two-phase mixture formed in the first separator, the first separator and the second separator in each case having at least one plate block each having at least three mutually parallel plates, between which a flow channel is formed in each case, the first separator being configured such that the mixture entering through the inlet region is led from top to bottom in the at least two flow channels, relative to the vertical, the second separator being configured and arranged in relation to the first separator such that the two-phase mixture emerging from the first separator enters the at least two flow channels of the second separator from below, relative to the vertical, and is led upward in said channels, and wherein the three-phase separator is configured in such a way that the three-phase mixture can enter the first separator of the three-phase separator only via the inlet region.

47 Claims, 6 Drawing Sheets

U.S. PATENT DOCUMENTS

| | | | | |
|---|---|---|---|---|
| 4,151,075 A | * | 4/1979 | Othmer | 210/706 |
| 4,428,841 A | * | 1/1984 | Favret, Jr. | 210/747.5 |
| 5,230,794 A | * | 7/1993 | Heijnen et al. | 210/188 |
| 5,855,785 A | | 1/1999 | Heijnen et al. | |
| 6,309,553 B1 | * | 10/2001 | Lanting et al. | 210/802 |
| 6,315,898 B1 | * | 11/2001 | Bull | 210/187 |
| 2002/0000409 A1 | * | 1/2002 | Lanting et al. | 210/603 |

FOREIGN PATENT DOCUMENTS

| | | |
|---|---|---|
| FR | 356522 | 7/1905 |
| FR | 2483799 | 12/1981 |
| WO | 9632177 | 10/1996 |

* cited by examiner

THREE-PHASE CASCADE SEPARATOR

CROSS REFERENCE TO RELATED APPLICATIONS

This is a continuation of PCT application No. PCT/EP2009/003283, entitled "THREE-PHASE CASCADE SEPARATOR", filed May 8, 2009, which is incorporated herein by reference.

BACKGROUND OF THE INVENTION

1. Field of the Invention

The present invention relates to a three-phase separator for separating gas and solids from a three-phase mixture containing liquid, gas and solids, a reactor including such a three-phase separator, and a process for separating gas and solids from a three-phase mixture containing liquid, gas and solids.

2. Description of the Related Art

Three-phase separators for separating gas and solids from a three-phase mixture containing liquid, gas and solids are used in a large number of technical areas, such as in the biological purification of effluent or process water. During the purification of biological effluent or process water, the effluent or process water to be purified is brought into contact with aerobic or anaerobic microorganisms which break down the organic contaminants contained in the effluent predominantly into carbon dioxide and water in the case of aerobic microorganisms, and, in the case of anaerobic microorganisms, predominantly into carbon dioxide and methane. The effluent or process water to be purified is generally supplied continuously to the corresponding reactors in which the biological purification takes place via a feed in the lower reactor region and said effluent or process water is led through a sludge bed located above the feed which, depending on the effluent characteristics and procedure, contains microorganism pellets or microorganism flocs. Here, the reactors must be supplied with the oxygen needed for the growth of the microorganisms during the aerobic purification of effluent or process water, normally in the form of air, the air being at least partially attached to the microorganism agglomerates in the form of gas bubbles during the operation of the reactor. As distinct from this, during the anaerobic purification of effluent or process water, operations are carried out with the exclusion of oxygen; however, during the breakdown of the organic compounds contained in the effluent or process water to be purified, the anaerobic microorganisms form gas in particular containing methane and carbon dioxide, which is also designated biogas, which is partly attached to the microorganism pellets in the form of small bubbles and partly rises upward in the reactor in the form of free small gas bubbles. On account of the attached small gas bubbles, the specific weight of the microorganism pellets or flocs decreases, for which reason at least some of the pellets or flocs rise upward in the reactor. Both in the case of anaerobic and in the case of aerobic purification of effluent or process water, a three-phase mixture containing water, microorganism pellets and gas (bubbles) thus forms in the reactor, from which mixture, in the upper reactor region, gas and solids must be separated in order to be able to discharge purified water from the reactor, for example through one or more overflows.

In order to separate gas and solids from a three-phase mixture containing liquid, gas and solids, a three-phase separator has been proposed in U.S. Pat. No. 5,855,785, which includes a gas hood in the lower region of which one or more plates arranged obliquely are provided in order to cause a liquid flow leading around this plate or these plates, which is intended to ensure good gas/liquid separation at the upper part of the plate(s). During the operation in this three-phase separator, the three-phase mixture containing liquid, gas and solids is led from top to bottom on the at least one plate, as seen from the vertical, the separation of gas from the three-phase mixture taking place at the upper end of the plate(s) and the separation of solids from the mixture being carried out by means of sedimentation of the solids at the lower end of the plate(s) toward the bottom of the reactor, while the purified water rises upward in the reactor.

One disadvantage of this three-phase separator, however, resides in the fact that the separation of solids is carried out downward in the reactor as a result of the microorganism pellets sinking from the lower end of the plate. Therefore, effective solids separation presupposes a sufficiently low flow velocity in the reactor, since otherwise the pellets are entrained upward with the liquid flow. Consequently, the process using the aforementioned three-phase separator is restricted to low liquid flow velocities, for which reason, based on the reactor volume, only a small quantity of water can be purified per unit time and per reactor volume by using said process, and the flexibility with regard to the process management is highly restricted. A further disadvantage of the aforementioned three-phase separator resides in the fact that said separator separates the gas contained in the three-phase mixture and the solids contained therein only inadequately, for which reason the water led away from the reactor has only a comparatively low purity.

WO 96/32177 discloses a three-phase separator which comprises a large number of caps having a V-shaped cross section which are in each case arranged parallel to one another and obliquely upward in relation to the vertical, a horizontally arranged gas hood being provided in the upper region of the caps and extending horizontally through the edges of the caps. During the operation of this apparatus, the three-phase mixture is introduced into the three-phase separator through an inlet region, in order then to be led from bottom to top through the flow channels provided between the individual caps. While the heavy solids contained in the mixture settle during this guidance from bottom to top, lightweight solids and gas contained in the mixture are collected in the gas hood and from there are discharged from the separator.

One disadvantage of the aforementioned separator resides in the fact that the separation of solids and gas contained in the three-phase mixture is primarily carried out in the gas hood and consequently simultaneously. However, the higher the flow velocity through the flow channels provided between the individual caps, the more incomplete is this separation of gas and solids from the mixture since, with increasing flow velocity, some of the solids with the small gas bubbles attached thereto are led past the gas hood and thus remain in the liquid. Consequently, the process using the aforementioned three-phase separator is restricted to low liquid flow velocities, for which reason, based on the reactor volume, only a small quantity of water can be purified per unit time and per reactor volume by using said process, and the flexibility with regard to the process management is highly restricted. Furthermore, with the aforementioned separator, only inadequate separation of gas and solids from the three-phase mixture is achieved.

What is needed in the art is a three-phase separator for separating gas and solids from a three-phase mixture containing liquid, gas and solids which can be operated with a high liquid flow velocity, in order in this way to be able to purify a large quantity of three-phase mixture per unit time and per reactor volume, and which achieves complete or at least virtually complete separation of gas and solids from a three-phase mixture containing liquid, gas and solids, and also a corresponding process for separating gas and solids from a three-phase mixture containing liquid, gas and solids.

SUMMARY OF THE INVENTION

The present invention provides a three-phase separator for separating gas and solids from a three-phase mixture containing liquid, gas and solids, including:
- an inlet region for the three-phase mixture,
- an outlet for a fraction rich in solids,
- an outlet for liquid,
- a first separator for separating gas from the three-phase mixture, forming a two-phase mixture which contains liquid and solids, the first separator forming the inlet region for the three-phase mixture or being connected to the inlet region for the three-phase mixture, the first separator having at least one plate block each having at least three mutually parallel plates, between which a flow channel is formed in each case, and the first separator being configured such that the mixture entering through the inlet region is led from top to bottom in the at least two flow channels, relative to the vertical, and
- a second separator for separating solids from the two-phase mixture formed in the first separator, the second separator having at least one plate block each having at least three mutually parallel plates, between which a flow channel is formed in each case, and the second separator being configured and arranged in relation to the first separator such that the two-phase mixture emerging from the first separator enters the at least two flow channels of the second separator from below, relative to the vertical, and is led upward in said channels, wherein the three-phase separator is configured in such a way that the three-phase mixture can enter the first separator of the three-phase separator only via the inlet region.

Since the three-phase separator includes two different separators, namely a first separator including at least one plate block, of which at least three plates are arranged such that the three-phase mixture flows from top to bottom through the flow channels formed therebetween, relative to the vertical, and a second separator including at least one plate block, of which at least three plates are arranged such that the three-phase mixture flows from bottom to top through the flow channels formed therebetween, relative to the vertical, excellent separation of gas from the three-phase mixture takes place in the first separator, and excellent separation of solids from the two-phase mixture discharged from the first separator takes place in the second separator, so that at least virtually complete separation of gas and solids from a three-phase mixture containing liquid, gas and solids is achieved in the three-phase separator. In addition, by way of the configuration of the three-phase separator in this way such that the three-phase mixture can enter the first separator of the three-phase separator only via the inlet region, contamination with gas of the two-phase mixture emerging from the first separator is prevented, since the three-phase mixture cannot enter the second separator, which contributes to the complete separation of gas and solids in the three-phase separator. Furthermore, this makes it possible for the three-phase separator according to the invention to be operated with a high liquid flow velocity, for which region a large quantity of three-phase mixture can be purified per unit time and per reactor volume. Furthermore, as a result of the provision of two different separators, of which one, namely the first, firstly separates gas from the three-phase mixture, while in the second separator the solids are separated from the two-phase mixture discharged from the first separator, it is possible for the throughput rate in the first separator to be set independently and in particular also to be higher than in the second separator, which permits excellent flexibility with regard to the process management and optimization of the purification efficiency. Overall, the three-phase separator according to the invention therefore permits at least virtually complete separation of gas and solids from a three-phase mixture containing liquid, gas and solids, it being possible to purify a large quantity of three-phase mixture per unit time and per reactor volume with said three-phase separator.

In the sense of the present invention, in harmony with the usual definition of this term, plate is understood to mean a thin, long plate, whereas the term plate block designates a plurality of plates arranged with their surfaces parallel or approximately parallel to one another, only the edges thereof pointing outward.

In order to achieve a high separation efficiency of the three-phase separator, it is proposed in a development of the idea of the invention that the first separator include at least one plate block which is built up from 3 to 15 and particularly preferably from 5 to 10 mutually parallel plates, between which a flow channel is formed in each case. For the same reason, it is preferred for the second separator to include at least one plate block which is built up from 3 to 60, particularly preferably from 5 to 25 and quite particularly preferably from 10 to 20 mutually parallel plates, between which a flow channel is formed in each case.

According to a further preferred embodiment of the present invention, the individual plates of the at least one plate block of the first separator and/or of the second separator have an inclination ($\alpha$) between 20° and 100° relative to the horizontal. As a result, a high separating efficiency of the separators is achieved, which means a high separating efficiency for gas in the first separator and a high separating efficiency for solids in the second separator.

Good separating capacity results are obtained for the second separator in particular if the angle of inclination ($\alpha$) of the individual mutually parallel plates of the at least one plate block is between 20° and 80° and preferably between 40° and 60°, relative to the horizontal.

In principle, the individual plates of the at least one plate block of the first separator can also have the aforementioned angle of inclination ($\alpha$), that is to say 20° to 80° and preferably 40° to 60°, relative to the horizontal. However, within the context of the present invention, it has surprisingly transpired that particularly outstanding gas separation from the three-phase mixture is achieved in the first separator if the angle of inclination ($\alpha$) of the individual mutually parallel plates of the at least one plate block of the first separator is between 80° and 100° and preferably about 90° and particularly preferably exactly 90°, relative to the horizontal.

Preferably, the inlet region for the three-phase mixture, which is particularly preferably formed by the at least one first separator, is arranged in the three-phase separator on the outside relative to the cross section thereof or, in the case of a three-phase separator having a round cross section, radially on the outside. This achieves the situation where the specific interface for the three-phase mixture in the inlet region is large, which further benefits the outstanding separation of gas and solids from the three-phase mixture.

With regard to a high separation capacity and in particular with regard to high specific throughput rates of the three-phase separator, according to a further preferred embodiment of the present invention it is preferred for the first separator to include at least two plate blocks which in each case have at least three mutually parallel plates having flow channels formed therebetween in each case, the plates of the individual plate blocks preferably having an inclination ($\alpha$) between 20° and 100°, particularly preferably an inclination ($\alpha$) between 80° and 100° and quite particularly preferably an inclination ($\alpha$) of 90°, relative to the horizontal. This makes it possible to distribute the individual plate blocks of the first separator uniformly in the outer region of the three-phase separator, relative to the cross section thereof, so that the three-phase mixture can enter not only via one side of the three-phase separator but via a plurality of sides of the three-phase separator.

In order to achieve a particularly uniform inward flow of the three-phase mixture over the outer circumference of the three-phase separator, it is proposed in a development of the idea of the invention that the first separator include at least four plate blocks, at least one of the side surfaces of each plate block adjoining a side surface of another plate block, and each plate block preferably being arranged on the outside in the three-phase separator, relative to the cross section thereof. It is preferred for the at least four plate blocks of the first separator to be connected to one another such that the plate blocks, as seen from the cross section of the three-phase separator, are arranged in the form of a polygon having at least 4 corners. In addition, in this embodiment, a wall or a plurality of walls can also be provided between individual plate blocks, so that the plate blocks and the at least one wall, as seen from the cross section of the three-phase separator, are arranged in the form of a polygon having at least 4 corners. This achieves the situation where the three-phase mixture can enter the three-phase separator uniformly via all the sides thereof.

In the aforementioned embodiment, the first separator can include, for example, four plate blocks, each of the two side surfaces of each plate block adjoining a side surface of another plate block, so that the individual plate blocks, as seen from the cross section of the three-phase separator, are arranged in the form of a lozenge.

As an alternative to this, it is also possible for the first separator to include six plate blocks, each of the two side surfaces of each plate block adjoining a side surface of another plate block, so that the individual plate blocks, as seen from the cross section of the three-phase separator, are arranged in the form of a hexagon.

According to a further variant of the aforementioned embodiment, the first separator can include four plate blocks, in each case one of the two side surfaces of two plate blocks adjoining each other at an angle of inclination of 10° to 80° relative to the longitudinal direction of the plate block, and the two plate block packs formed from the two plate blocks that adjoin each other in this way being connected to each other via a wall connecting the side surfaces of the plate block packs in each case, so that the four plate blocks and the two walls, as seen from the cross section of the three-phase separator, are arranged in the form of a hexagon.

According to a still further variant of the aforementioned embodiment, the first separator can include four plate blocks, in each case one of the two side surfaces of two plate blocks adjoining each other at an angle of inclination of 10° to 80° relative to the longitudinal direction of the plate block, and one of the side surfaces of the two plate block packs formed from the two plate blocks that adjoin each other in this way adjoining each other directly and, on the respective other side surface thereof, being connected to each other via a wall connecting the side surfaces of the plate block packs, so that the four plate blocks and the wall, as seen from the cross section of the three-phase separator, are arranged in the form of a pentagon. In this variant, it is of course also possible to replace the wall by a plate block, so that the first separator includes five plate blocks, each of the two side surfaces of each plate block adjoining a side surface of another plate block, so that the individual plate blocks, as seen from the cross section of the three-phase separator, are arranged in the form of a pentagon.

As already explained, it is preferred for the inlet region for the three-phase mixture to be arranged on the outside in the three-phase separator, relative to the cross section thereof, and for the inlet region to be formed by the at least one first separator. In this case, it is preferred for the end face(s) of the at least one plate block of the first separator to bound the three-phase separator on the outside.

According to a further preferred embodiment of the present invention, the first separator includes at least two, preferably four, plate block assemblies, of which each plate block assembly includes at least four plate blocks, at least one of the side surfaces of each plate block adjoining a side surface of another plate block. Here, it is preferred for the at least four plate blocks of each plate block assembly to be connected to one another in such a way that the individual plate blocks, as seen from the cross section of the three-phase separator, are arranged in the form of a polygon having at least 4 corners. In addition, in this embodiment, a wall or a plurality of walls can also be provided between individual plate blocks, so that the plate blocks and the at least one wall, as seen from the cross section of the three-phase separator, are arranged in the form of a polygon having at least 4 corners. The second separator, which particularly preferably includes exactly one plate block, is preferably provided in the middle of each polygon. As a result of providing at least two, preferably four, plate block assemblies, a modular structure of the three-phase separator is achieved, which makes it possible to adapt the shape and the size of the three-phase separator to an existing reactor to be equipped therewith. Furthermore, in this way the height of the individual plate blocks can be reduced as compared with that of a three-phase separator including one plate block assembly.

In the aforementioned embodiment, it is particularly preferred for the first separator to include at least two, preferably four, plate block assemblies, of which each plate block assembly includes four plate blocks, in each case one of the two side surfaces of two plate blocks of each plate block assembly adjoining each other at an angle of inclination of 10° to 80°, in relation to the longitudinal direction of the plate block, and the two plate block packs formed from the two plate blocks that adjoin each other in this way being connected to each other via a wall connecting the side surfaces of the plate block packs in each case, so that the four plate blocks and the two walls of each plate block assembly, as seen from the cross section of the three-phase separator, are arranged in the form of a hexagon. The second separator, which particularly preferably includes one plate block, is preferably provided in the middle of each hexagon.

Preferably, the inlet region for the three-phase mixture is formed by the upper ends of the individual plates of the at least one plate block of the first separator, it being particularly preferred in particular in this case for the at least one plate block of the first separator, as seen from the cross section of the three-phase separator, to be arranged on the outside.

Furthermore, it is preferred for the plates of the at least one plate block of the second separator to be arranged relative to their longitudinal sides at an angle of 10° to 90°, preferably from 45° to 90° and particularly preferably from 55° to 90° to the plates of the at least one first separator.

While, as explained, it is preferred for the first separator to include a plurality of plate blocks, it is preferred for the second separator to have only one plate block. In this case, the plate block of the second separator preferably adjoins at least one plate block of the first separator, it being particularly preferable for the plate block of the second separator to be arranged between at least two plate blocks of the first separator and to adjoin said plate blocks.

In the aforementioned embodiment, it has proven to be particularly advantageous if the first separator includes four plate blocks, each of the two side surfaces of each plate block adjoining a side surface of another plate block, so that the individual plate blocks, as seen from the cross section of the three-phase separator, are arranged in the form of a lozenge, and if the second separator has one plate block which, as seen from the cross section of the three-phase separator, is arranged in the middle of the lozenge formed by the four plate blocks of the first separator.

According to a further variant of the aforementioned embodiment, the first separator can include four plate blocks, in each case one of the two side surfaces of two plate blocks adjoining each other at an angle of inclination of 10° to 80° relative to the longitudinal direction of the plate block, and the two plate block packs formed from the two plate blocks that adjoin each other in this way being connected to each other via a wall connecting the side surfaces of the plate block packs in each case, so that the four plate blocks and the two walls, as seen from the cross section of the three-phase separator, are arranged in the form of a hexagon, and the second separator has one plate block which, as seen from the cross section of the three-phase separator, is arranged in the middle of the hexagon formed by the four plate blocks and the two walls of the first separator. In this variant, it is of course also possible to replace the two walls by a plate block in each case, so that the first separator includes six plate blocks, each of the two side surfaces of each plate block adjoining a side surface of another plate block, so that the individual plate blocks, as seen from the cross section of the three-phase separator, are arranged in the form of a hexagon, the plate block of the second separator, as seen from the cross section of the three-phase separator, being arranged in the middle of the hexagon formed by the six plate blocks of the first separator.

The plates of the plate block of the second separator are preferably arranged in relation to their longitudinal sides at an angle of 55° to 90° to the plates of the at least one first separator.

In order to separate the at least one first separator from the at least one second separator, it is proposed in a development of the idea of the invention to provide an intermediate wall between the at least one plate block of the second separator and the at least one plate block adjacent thereto and belonging to the first separator, said intermediate wall, as seen from the vertical, projecting beyond the upper end of the first separator. As a result, in particular in the embodiment in which the inlet region for the three-phase mixture is formed by the first separator, three-phase mixture from the inlet region is reliably prevented from entering the second separator.

In the aforementioned embodiment, it is in particular advantageous that the intermediate wall, as seen from the longitudinal axis of the three-phase separator, is the innermost plate of the plate block that belongs to the first separator and adjoins the second separator, the innermost plate being higher than the other plates of the same plate block. In this case, the intermediate wall is consequently a lengthened plate.

The outlet for liquid is preferably arranged above the upper end of the at least one plate block of the second separator.

If the three-phase separator according to the invention includes at least two plate blocks, it is preferred for an outer wall to be provided in each case at the lower end of the outermost plates of each of the at least two plate blocks of the first separator, as seen from the longitudinal axis of the three-phase separator. It has proven to be particularly preferable for at least two of the outer walls, as seen from the longitudinal axis of the three-phase separator, to be angled down inward, so that the outer walls, as seen from the vertical, run together downward, forming a throat. This makes it possible for the fraction rich in solids, forming between the at least one first separator and the at least one second separator during the operation of the apparatus, to collect in the throat and to be able to leave the separator completely via the appropriate outlet. It has proven to be particularly advantageous if the outer walls forming the throat run at an angle to each other from 30° to 120°, preferably from 40° to 100°, particularly preferably from 60° to 80° and quite particularly preferably of 70°.

In the aforementioned embodiment, the outlet for the fraction rich in solids is preferably provided on the throat, the outlet particularly preferably being constructed in the form of a slot running parallel to the throat.

In order reliably to prevent penetration of three-phase mixture into the three-phase separator at points outside the inlet region, and thus in particular also reliably to prevent penetration of three-phase mixture into the second separator, it is proposed in a development of the idea of the invention to provide a baffle underneath the outlet for the fraction rich in solids and to configure said baffle in such a way that no liquid, gas or solids mixture flowing vertically upward from underneath the three-phase separator can enter the three-phase separator through the outlet.

A further subject of the present invention is a reactor which has the previously described three-phase separator according to the invention in its upper region.

The reactor can be, in particular, an anaerobic or aerobic reactor for purifying effluent or process water, which has at least one feed line for feeding effluent or process water to be purified into the reactor, at least one discharge line for discharging purified effluent or process water from the reactor, and at least one discharge line for discharging gas from the reactor. The reactor is particularly preferably an anaerobic or aerobic reactor for the continuous purification of effluent or process water in the paper industry.

A further subject of the present invention is a process for separating gas and solids from a three-phase mixture containing liquid, gas and solids. According to the invention, this process includes the following steps:

a) introducing the three-phase mixture via an inlet region into a first separator of a three-phase separator, the first separator forming the inlet region for the three-phase mixture or being connected to the inlet region for the three-phase mixture, and the first separator having at least one plate block each having at least three mutually parallel plates, between which a flow channel is formed in each case, b) leading the three-phase mixture from top to bottom through the at least two flow channels of the first separator, in relation to the vertical, in order to separate gas from the three-phase mixture, forming a two-phase mixture, c) extracting the two-phase mixture from the first separator, d) introducing at least some of the two-phase mixture into a second separator, the second separator having at least one plate block each having at least three mutually parallel plates, between which a flow channel is formed in each case, e) leading the two-phase mixture from bottom to top through the at least two flow channels of the second separator, in relation to the vertical, in order to separate solids from the two-phase mixture, forming a purified liquid and a fraction rich in solids, f) discharging the purified liquid from the second separator, and g) discharging the fraction rich in solids from the three-phase separator through an outlet, only two-phase mixture discharged from the first separator but no three-phase mixture being introduced into the second separator.

Particularly good results are obtained if the process according to the invention is carried out in a three-phase separator according to the invention as described previously.

Preferably, the process is operated in such a way and the area (A) of the outlet from the three-phase separator for the fraction rich in solids is dimensioned in such a way that the entry velocity of the three-phase mixture into the inlet region of the first separator is lower than the rate of rise of the gas bubbles in the three-phase mixture.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
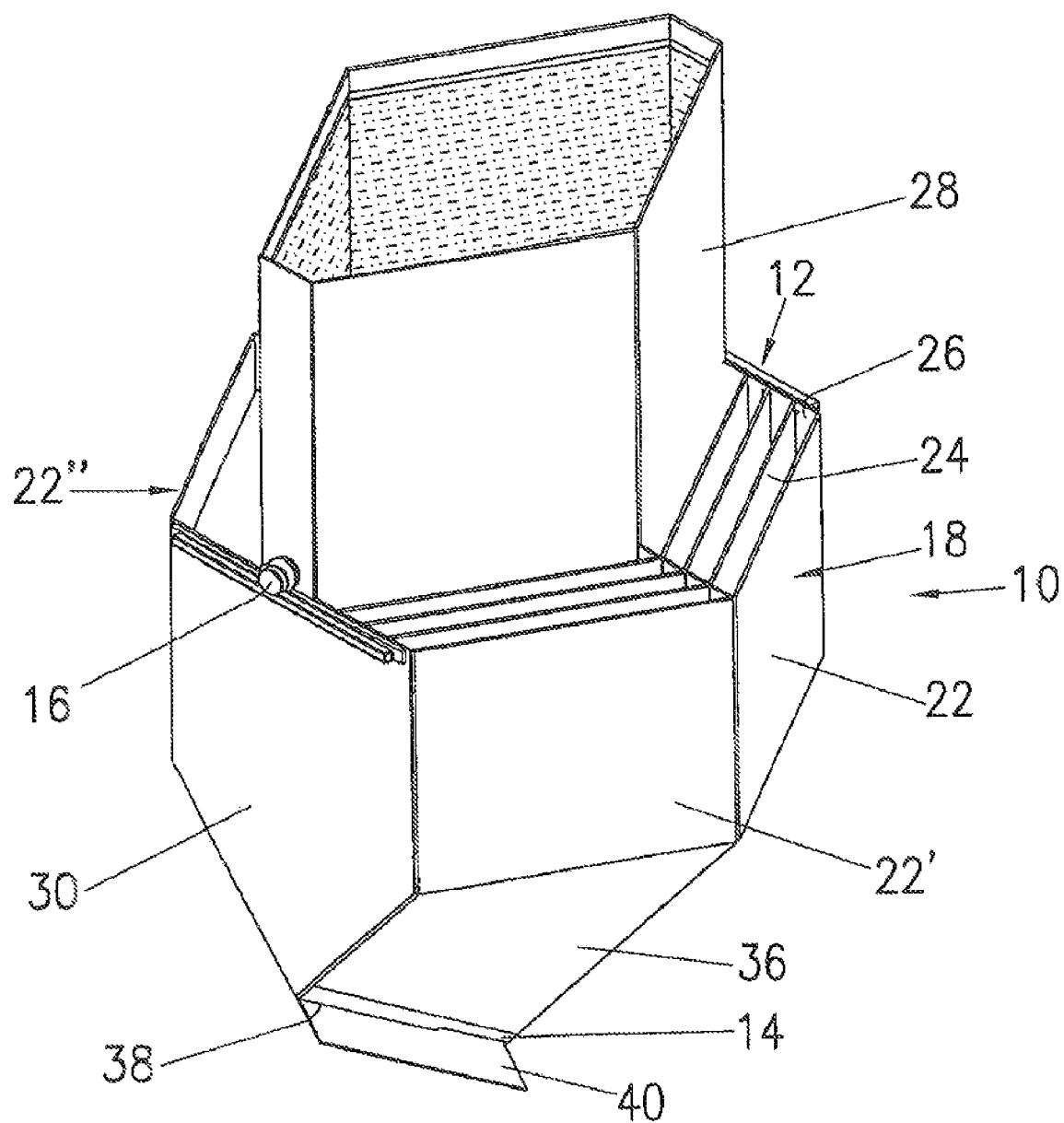
FIG. 1 shows a perspective view of a three-phase separator according to a first exemplary embodiment of the present invention.
Figure 2:
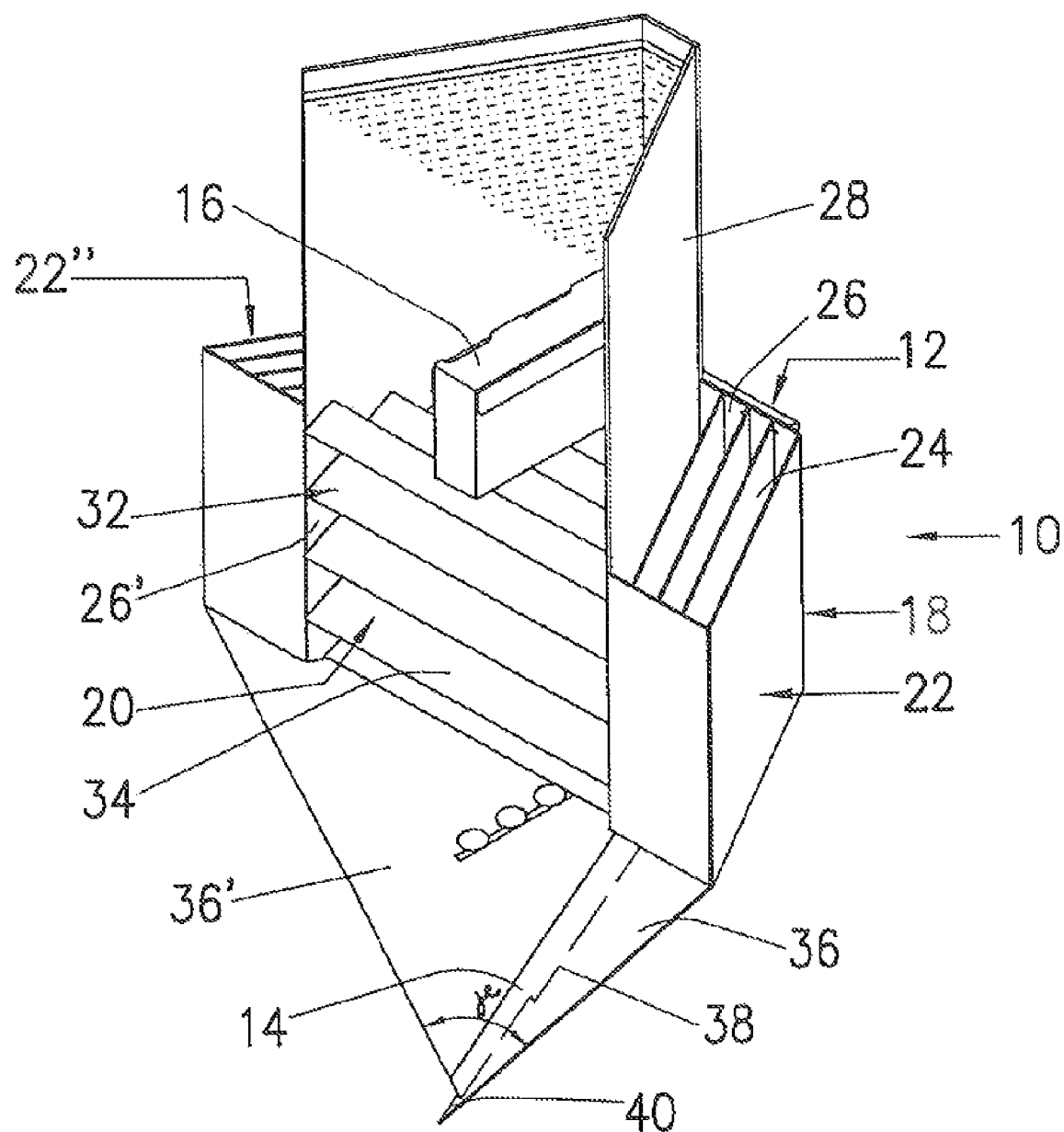
FIG. 2 shows a perspective longitudinal section of the three-phase separator illustrated in FIG. 1.

Referring now to the drawings, and more particularly to FIGS. 1 and 2, there is shown the three-phase separator 10 according to a first exemplary embodiment of the present invention, which includes an inlet region 12 for the three-phase mixture, an outlet 14 for a fraction rich in solids, an outlet 16 for purified water, a first separator 18 for separating gas from the three-phase mixture, forming a two-phase mixture which contains liquid and solids, and a second separator 20 for separating solids from the two-phase mixture formed in the first separator.

The first separator includes four plate blocks 22, 22', 22" which each have five mutually parallel oriented plates 24 which, in relation to the horizontal, have an inclination of 90°, i.e. which, in relation to the cross section of the three-phase separator 10, are arranged vertically, a flow channel 26 in each case being formed between two respectively adjacent plates 24. Here, the outermost plates 24 of the plate blocks 22, 22', 22" of the first separator 18, as seen in each case from the cross section of the three-phase separator 10, bound the three-phase separator 10 on the outside. On the other hand, the innermost plates of the plate blocks 22, 22', 22" of the first separator 18, in each case as seen from the longitudinal axis of the three-phase separator 10, are lengthened upward with respect to the other plates 24 and form an intermediate wall 28, which separates the first separator 18 from the second separator 20. The inlet region 12 for the three-phase mixture is formed by the individual upper ends of the plates 22, 22', 22" of the first separator 18.

Of the four plate blocks 22, 22', 22" of the first separator 18, in each case one of the two side surfaces of two plate blocks 22, 22', 22" adjoin each other at an angle of inclination of 60° relative to the longitudinal direction of the plate block 22, 22', 22", and the two plate block packs formed from the two plate blocks 22, 22', 22" that adjoin each other in this way are connected to each other via a wall 30 connecting the side surfaces of the plate block packs in each case, so that the four plate blocks 22, 22', 22" and the two walls 30, as seen from the cross section of the three-phase separator 10, are arranged in the form of a hexagon.

The second separator 18 includes a plate block 32 which has five mutually parallel oriented plates 34 which, in relation to the horizontal, have an inclination of about 50°, in each case a flow channel 26' being formed between two adjacent plates 34 in each case. In this case, the plate block 32 of the second separator 18 is arranged in the middle of the hexagon formed by the four plate blocks 22, 22', 22" of the first separator 18 and the two walls 30 and adjoins the four plate blocks 22, 22', 22" of the first separator 18. Above the plates 34 of the second separator, the outlet 16 for purified water is provided in the form of an overflow.

In each case at the lower end, as seen from the longitudinal axis of the three-phase separator 10, of the outermost plates 24 of each of the four plate blocks 22, 22', 22" of the first separator 18 and at the lower ends of the two walls 30 there is provided an outer wall 36, 36', five of the six outer walls 36, 36', as seen from the longitudinal axis of the three-phase separator 10, being angled down inward, so that the outer walls, as seen from the vertical, run together downward, forming a throat 38. In this case, the outer walls 36, 36' forming the throat 38 run toward each other at an angle (γ) of about 70°.

The outlet 14 for the fraction rich in solids is provided on the throat 38, the outlet 14 being constructed in the form of a slot running parallel to the throat 38. A baffle 40 is provided underneath the outlet 14, which is an extension of the outer wall 36' and which is configured in such a way that no liquid, gas or solids flowing vertically upward from underneath the three-phase separator 10 can enter the outlet 14 through the outlet 14.

Figure 3:
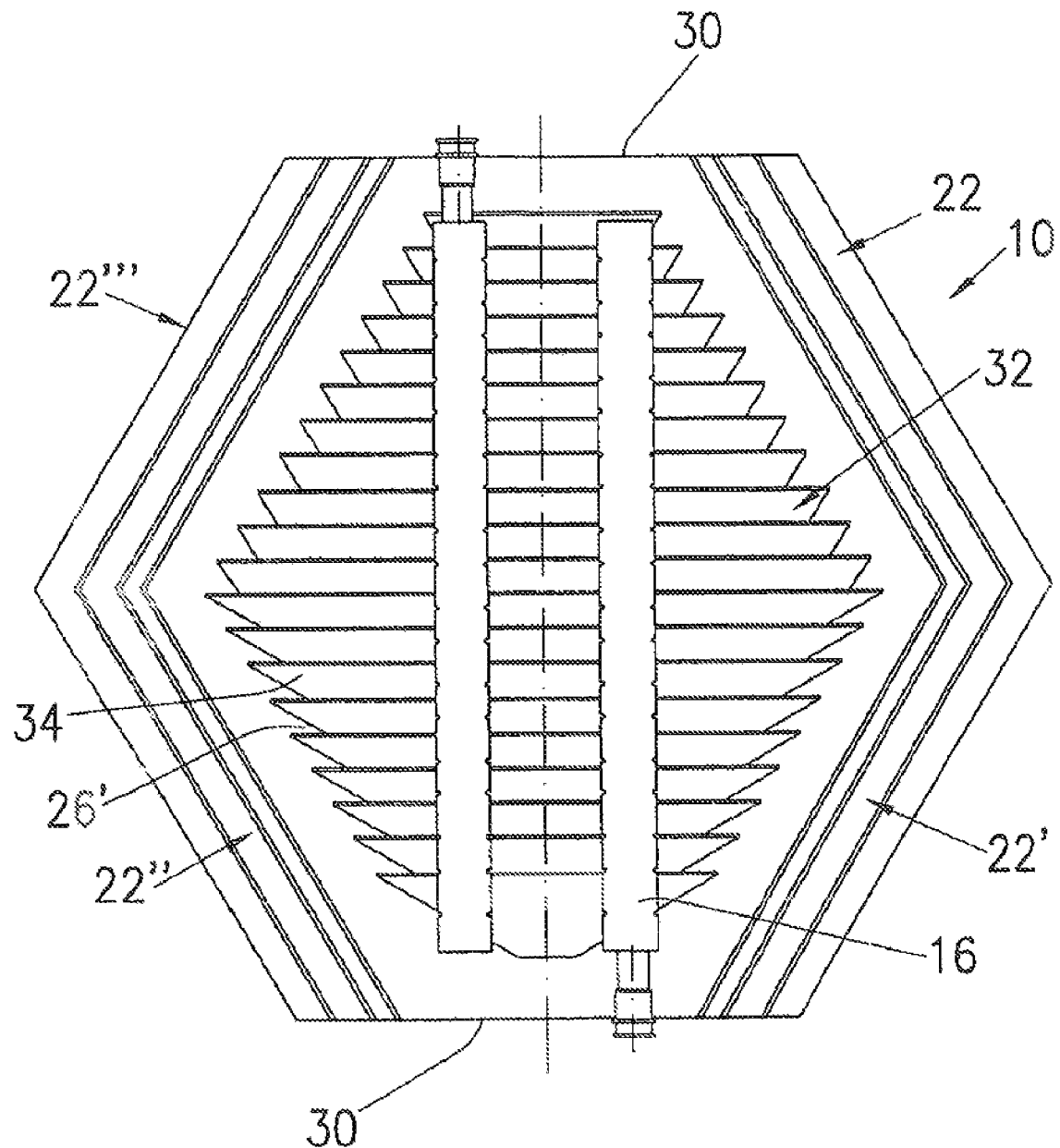
FIG. 3 shows a plan view of a three-phase separator according to a second exemplary embodiment of the present invention.
Figure 4:
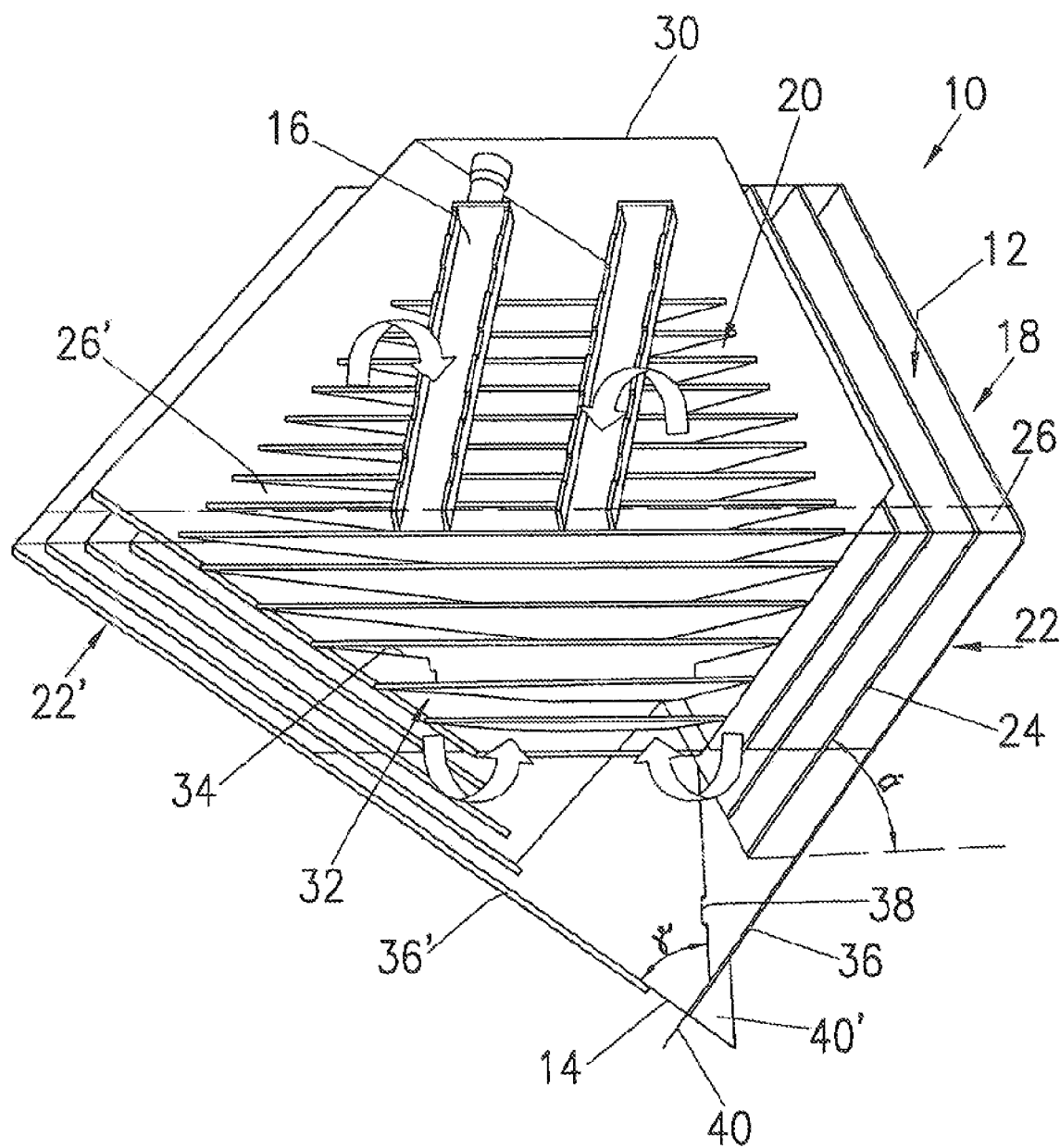
FIG. 4 shows a perspective longitudinal section of the three-phase separator illustrated in FIG. 3.

Similarly to that shown in FIGS. 1 and 2, the three-phase separator 10 shown in FIGS. 3 and 4 according to a second exemplary embodiment of the invention has a first separator 18 and a second separator 20, the first separator 18 including four plate blocks 22, 22', 22", 22'" and the second separator 20 including one plate block 32. Here, the walls 30 and the four plate blocks 22, 22', 22", 22'" of the first separator 18 are connected to one another in the form of a hexagon, the second separator 20 being arranged in the center of the hexagon, so as to adjoin the four plate blocks 22, 22', 22", 22'" of the first separator 18.

In contrast to the three-phase separator 10 shown in FIGS. 1 and 2, the individual plates 24 of the four plate blocks 22, 22', 22", 22'" of the first separator 18 of the three-phase separator 10 shown in FIGS. 3 and 4 have an inclination (α) of approximately 60° in relation to the horizontal. In a further difference from that shown in FIGS. 1 and 2, the outer walls 36, 36' of the three-phase separator 10 shown in FIGS. 3 and 4 are formed by the extended outermost plates 24 of the plate blocks 22, 22', 22'', 22''' of the first separator 18. Here, the two outer walls 36, 36' extend at an angle (γ) of approximately 70° with respect to one another and converge with the formation of a throat 38.

The outlet 14 for the fraction rich in solids is provided on the throat 38, the outlet 14 being formed in the shape of a slot which extends parallel to the throat 38. Two baffles 40, 40' are provided below the outlet 14, which baffles 40, 40' are in each case an extension of the outer walls 36, 36' and are configured in such a way that no liquid, gas or solid flowing vertically upward from underneath the three-phase separator 10 can enter the outlet 14 through the outlet 14.

Figure 5:
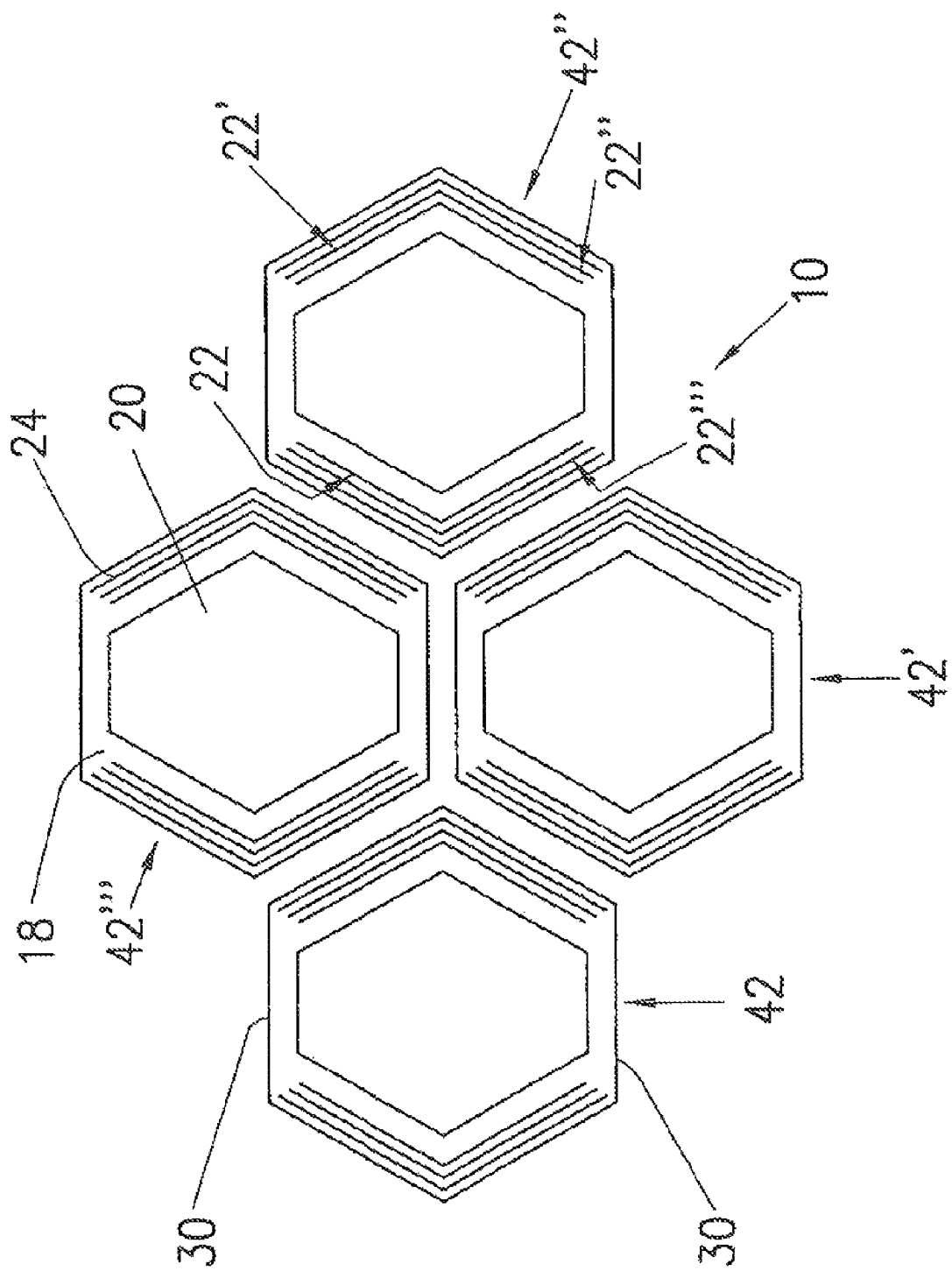
FIG. 5 shows a plan view of a three-phase separator according to a third exemplary embodiment of the present invention, which has four plate block assemblies.

The three-phase separator 10 illustrated in FIG. 5 includes four plate block assemblies 42, 42', 42'', 42''' in each case, of which each is configured as explained in FIGS. 1 and 2. Consequently, each plate block assembly 42, 42', 42'', 42''' includes a first separator 18 which is assembled from four plate blocks 22, 22', 22'', 22''' arranged in the form of a hexagon and two walls 30, the second separator 20, including one plate block, being arranged in the middle of the hexagon. As a result of providing a plurality of plate block assemblies 42, 42', 42'', 42''', a modular structure of the three-phase separator 10 is achieved, which makes it possible to adapt the shape and the size of the three-phase separator to an existing reactor to be equipped therewith. Furthermore, in this way the height of the individual plate blocks can be reduced as compared with a three-phase separator including one plate block assembly.

Figure 6:
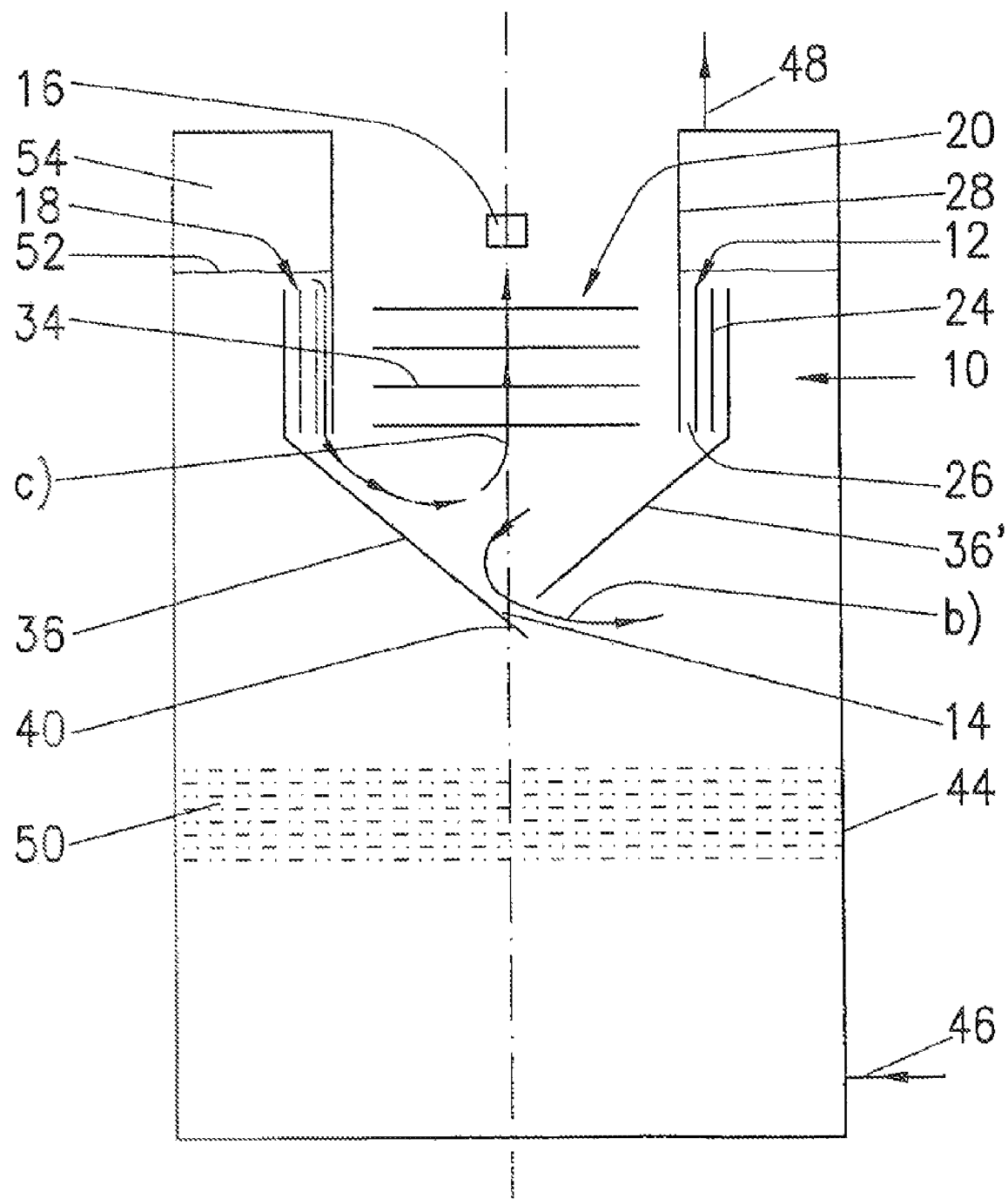
FIG. 6 shows a schematic longitudinal section of a reactor for the anaerobic purification of effluent, which has a three-phase separator according to the present invention as illustrated in FIGS. 1 and 2.

FIG. 6 illustrates schematically a reactor 44 for the anaerobic purification of effluent, which, in its upper region, has a three-phase separator 10 having a configuration as illustrated in FIGS. 1 and 2. In addition, at its lower end, the reactor has a feed line for effluent 46 and, at its upper end, a gas discharge line 48. In the region between the lowest and the central third of the reactor 44, a multiplicity of pellets 50 made of anaerobic microorganisms is provided, which are kept floating by the effluent flow maintained in the reactor 44 during the operation of the reactor 44.

During operation of the reactor 44 according to the invention, illustrated in FIG. 6, said reactor is fed continuously via the feed line 46 with effluent to be purified, which originates from a paper mill, for example, and which, via a feed distributor (not illustrated) in the lower region of the reactor 44, mixes with the medium in the reactor 44 and is led through the sludge bed located above the feed and containing microorganism pellets 50, the anaerobic microorganisms in the reactor 44 breaking down the organic contaminants contained in the effluent predominantly into carbon dioxide and methane. The biogas formed during the breakdown of the organic compounds, in particular containing methane and carbon dioxide, is partly attached to the microorganism pellets 50 in the form of small bubbles and partly rises upward in the reactor 44 in the form of free small gas bubbles. On account of the attached small gas bubbles, the specific weight of the pellets 50 decreases, for which reason the pellets 50 rise upward in the reactor 44.

In the upper region of the reactor there is therefore a three-phase mixture which, in addition to the water and the microorganism pellets 50 suspended therein, contains free gas bubbles and small gas bubbles adhering to the microorganism pellets 50. While a large part of the gas bubbles which are not attached to microorganism pellets 50, on account of their high buoyancy and the upwardly directed liquid flow, rise upward past the inlet region 12 of the three-phase separator 10 as far as over the gas space 54 provided above the water level 52, the three-phase mixture which, in addition to the water, contains microorganism pellets 50, microorganism pellets 50 with attached small gas bubbles and comparatively small quantities of free gas bubbles entering the three-phase separator 10 via the inlet region 12, where said mixture flows from top to bottom through the flow channels 26 provided between the plates 24 of the plate blocks 22, 22', 22'', 22'''. In the process, in the individual flow channels 26 there forms a velocity profile running parabolically over the cross section of the flow channels 26, as a result of which, between adjacent microorganism pellets 50 with attached small gas bubbles, on account of frictional forces there result pressure gradients, on account of which the small gas bubbles attached to the microorganism pellets 50 separate from the microorganism pellets 50 and, together with the other free gas bubbles, rise upward in the plates 24 of the first separator 18 and leave the three-phase separator 10 via the inlet region 12 and rise upward as far as the gas space 54. Because of this, in the first separator 18, the gas is separated completely from the three-phase mixture, so that from the flow channels 26 of the first separator 18, at the bottom, there emerges a two-phase mixture, which now contains only the water and microorganism pellets (without adhering small gas bubbles).

A partial stream of the two-phase mixture emerging from the bottom of the first separator 18, which is illustrated in FIG. 6 by the arrow identified by c), is led through the plates 34 of the second separator 20 from bottom to top on account of the flow conditions in the three-phase separator 10. In the process, in the individual flow channels 26' of the second separator 20 there forms a velocity profile running parabolically over the cross section of the flow channels 26', as a result of which the microorganism pellets 50 in the flow channels 26' move toward the walls of the plates 34 on account of the force arising from the force of gravity directed vertically downward and the hydraulic force directed obliquely upward. Since the hydraulic force decreases in the direction of the walls of the plates 34 on account of the velocity profile running parabolically over the cross section of the flow channels 26', the microorganism pellets 50 finally sink downward on the walls of the plates 34 in the flow channels 26' and leave the second separator 20 at the bottom, whereas the purified water, from which the microorganism pellets 50 have been separated, rises upward in the flow channels 26' and leaves the second separator 20 at the top, where said water passes into the outlet 16, via which the purified water is discharged from the reactor 44.

As a result, the microorganism pellets 50 collect in the lower region of the three-phase separator 10 and are discharged from the three-phase separator 10 through the outlet 14 together with the other partial stream, which is represented in FIG. 6 by the arrow identified by b). The baffle 40 reliably prevents three-phase mixture flowing from bottom to top in the reactor 44 from entering the three-phase separator 10 via the outlet 14.

The ratio between the first partial stream, represented in FIG. 6 by the arrow identified by c), leading into the second separator 20 and the partial stream discharged from the three-phase separator 10 via the outlet 14, represented in FIG. 6 by the arrow identified by b), is determined substantially by the pressure difference across the outlet 14, i.e. by the difference between the pressure on the inner side of the outlet 14, as seen from the three-phase separator 10, and the pressure on the outer side of the outlet 14, and by the magnitude of the area of the outlet 14. Here, given a constant pressure difference across the outlet 14, the partial stream represented in FIG. 6 by the arrow identified by b) becomes greater the greater the area of the outlet 14, which also means that the flow velocity of the mixture through the first separator 18 is increased. In order to keep the flow velocity through the first separator 18 below a critical limiting value, above which free gas bubbles from the medium present outside the three-phase separator 10 penetrate increasingly into the first separator 18, the area of the outlet 14 for the fraction rich in solids from the three-phase separator 10 is preferably dimensioned such that the entry velocity or flow velocity of the three-phase mixture into the inlet region 12 of the first separator 18 is lower than the speed of rise of the (free) gas bubbles in the three-phase mixture. This ensures that all the microorganism pellets 50 separated in the three-phase separator 10 are discharged from the three-phase separator 10 and, likewise, an excessively high flow velocity in the first separator 18 is avoided.

In a corresponding way, it is preferred for the area of the outlet 14 to be adjustable, so that, during the operation of the three-phase separator 10, the ratio of the partial stream b) to the partial stream c) can be optimized in accordance with the requirements. For instance, by reducing the area, the ratio of the partial stream b) to the partial stream c) can be reduced, so that more of the flocky microorganism structures are retained in the reactor 44. On the other hand, it is also possible, by enlarging the area of the outlet 14, to increase the ratio of the partial stream b) to the partial stream c), so that more granular microorganism structures are enriched in the reactor 44.

For the same reasons, namely the optimization of the selectivity of the sludge characteristics in the reactor 44, the overall area of the flow channels 26' of the second separator 20 can also be provided adjustably, in order to be able to configure the charging of the second separator 20 flexibly during the operation of the three-phase separator 10. For instance, via a slide element (not illustrated), which is preferably provided in the outlet 16 for purified water, some of the flow channels 26' of the second separator 20 can be stopped during the operation, as a result of which the flow velocity through the remaining flow channels 26' is increased, which means that lightweight flocky solids structures can be washed out of the reactor 44. If one or more such slide elements are provided in the outlet 16, the outlet 16 must be connected to the upper ends of the plates 34 of the second separator 20 or to an extension of the plates 34 for the aforementioned purpose.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

LIST OF DESIGNATIONS

10 Three-phase separator
12 Inlet region for the three-phase mixture
14 Outlet for fraction rich in solids
16 Outlet/discharge line for liquid/purified water
18 First separator
20 Second separator
22,22',22'',22''' Plate block of the first separator
24 Plate of the first separator
26,26' Flow channel
28 Intermediate wall
30 Wall
32 Plate block of the second separator
34 Plate of the second separator
36,36' Outer wall
38 Throat
40,40' Baffle
42,42',42'',42''' Plate block assembly
44 Anaerobic reactor
46 Feed line for effluent
48 Gas discharge line
50 Microorganism pellets
52 Water level
54 Gas space

What is claimed is:

1. A three-phase separator for separating a gas and a plurality of solids from a three-phase mixture containing a liquid, the gas, and the plurality of solids, said three-phase separator comprising:
   an inlet region for the three-phase mixture;
   an outlet for a fraction rich in the plurality of solids;
   an outlet for the liquid;
   a first separator for separating the gas from the three-phase mixture and thereby for forming a two-phase mixture which contains the liquid and the plurality of solids, said first separator one of forming said inlet region for the three-phase mixture and being connected to said inlet region for the three-phase mixture, said first separator including at least one first plate block each having at least two first flow channels and at least three mutually parallel first plates between which a respective one of said at least two first flow channels is formed in each case, said first separator being configured such that the three-phase mixture entering through said inlet region is led from a top of said first separator to a bottom of said first separator in said at least two first flow channels, relative to a vertical; and
   a second separator for separating the plurality of solids from said two-phase mixture formed in said first separator, said second separator including at least one second plate block each having at least two second flow channels and at least three mutually parallel second plates between which a respective one of said at least two second flow channels is formed in each case, said second separator being configured and arranged in relation to said first separator such that said two-phase mixture emerging from said first separator enters said at least two second flow channels of said second separator from below, relative to said vertical, and is led upward in said at least two second flow channels, the three-phase separator being configured in such a way that the three-phase mixture can enter said first separator of the three-phase separator only via said inlet region.

2. The three-phase separator according to claim 1, wherein said first separator includes said at least one first plate block which is built up from 3 to 15 said mutually parallel first plates between which a respective one of said first flow channels is formed in each case.

3. The three-phase separator according to claim 2, wherein said at least one first plate block is built up from 5 to 10 said mutually parallel first plates between which a respective one of said first flow channels is formed in each case.

4. The three-phase separator according to claim 1, wherein second separator includes said at least one second plate block which is built up from 3 to 60 said mutually parallel second plates between which a respective one of said second flow channels is formed in each case.

5. The three-phase separator according to claim 4, wherein said at least one second plate block is built up from 5 to 25 said mutually parallel second plates between which a respective one of said second flow channels is formed in each case.

6. The three-phase separator according to claim 4, wherein said at least one second plate block is built up from 10 to 20 said mutually parallel second plates between which a respective one of said second flow channels is formed in each case.

7. The three-phase separator according to claim 1, wherein at least one of (a) individual ones of said mutually parallel first plates of said at least one first plate block of said first separator and (b) individual ones of said mutually parallel second plates of said at least one second plate block of said second separator have an inclination between 20° and 100° relative to a horizontal.

8. The three-phase separator according to claim 7, wherein said individual ones of said mutually parallel first plates of said at least one first plate block of said first separator have said inclination between 80° and 100° relative to said horizontal.

9. The three-phase separator according to claim 7, wherein said individual ones of said mutually parallel first plates of said at least one first plate block of said first separator have said inclination of 90° relative to said horizontal.

10. The three-phase separator according to claim 7, wherein said individual ones of said mutually parallel second plates of said at least one second plate block of said second separator have said inclination between 20° and 80° relative to said horizontal.

11. The three-phase separator according to claim 7, wherein said individual ones of said mutually parallel second plates of said at least one second plate block of said second separator have said inclination between 40° and 60° relative to said horizontal.

12. The three-phase separator according to claim 1, wherein said first separator includes at least two of said first plate block each of which has at least three said mutually parallel first plates having first flow channels formed therebetween in each case, said mutually parallel first plates of each said first plate block having an inclination between 20° and 100° relative to a horizontal.

13. The three-phase separator according to claim 12, wherein said mutually parallel first plates of each said first plate block has an inclination between 80° and 100° relative to a horizontal.

14. The three-phase separator according to claim 12, wherein said mutually parallel first plates of each said first plate block has an inclination of 90° relative to a horizontal.

15. The three-phase separator according to claim 12, wherein said first separator includes at least four of said first plate block each of which includes a plurality of side surfaces, at least one of said plurality of side surfaces of each first plate block adjoining a respective one of said plurality of side surfaces of another said first plate block.

16. The three-phase separator according to claim 15, wherein said at least four first plate blocks of said first separator are connected one of to one another and to one another via at least one wall of said first separator such that one of (a) said at least four first plate blocks and (b) said at least four first plate blocks and said at least one wall, as seen from a cross-section of the three-phase separator, are arranged in a form of a polygon having at least 4 corners.

17. The three-phase separator according to claim 15, wherein said first separator includes four of said first plate block, said plurality of side surfaces being two said side surfaces, each of said two side surfaces of each said first plate block adjoining a respective one of said side surfaces of another said first plate block so that each said first plate block, as seen from a cross-section of the three-phase separator, are arranged in a form of a lozenge.

18. The three-phase separator according to claim 15, wherein said first separator includes six of said first plate block, said plurality of side surfaces being two said side surfaces, each of said two side surfaces of each said first plate block adjoining a respective one of said side surfaces of another said first plate block so that each said first plate block, as seen from a cross-section of the three-phase separator, are arranged in a form of a hexagon.

19. The three-phase separator according to claim 15, wherein said first separator includes four of said first plate block, said plurality of side surfaces being two said side surfaces, said four first plate blocks together forming two first plate block packs such that two of said first plate blocks together form one said first plate block pack and two others of said first plate blocks form another said first plate block pack, each said first plate block pack being formed by one said side surface of each respective one of two said first plate blocks adjoining each other at an angle of inclination of 10° to 80° relative to a longitudinal direction of a respective said first plate block, said first separator further including two walls, said first plate block packs being connected to one another via said walls connecting respective ones of said side surfaces together so that said four first plate blocks and said two walls, as seen from a cross-section of the three-phase separator, are arranged in a form of a hexagon.

20. The three-phase separator according to claim 15, wherein said first separator includes four of said first plate block, said plurality of side surfaces being two said side surfaces, said four first plate blocks together forming two first plate block packs such that two of said first plate blocks together form one said first plate block pack and two others of said first plate blocks form another said first plate block pack, each said first plate block pack being formed by one said side surface of each respective one of two said first plate blocks adjoining each other at an angle of inclination of 10° to 80° relative to a longitudinal direction of a respective said first plate block, said first separator further including a wall, said first plate block packs being connected to each other (a) by respective ones of said side surfaces adjoining each other directly and (b) via said wall connecting respective other ones of said side surfaces together, so that said four first plate blocks and said wall, as seen from a cross-section of the three-phase separator, are arranged in a form of a pentagon.

21. The three-phase separator according to 1, wherein said at least one first plate block of said first separator includes at least one end face which bounds the three-phase separator on an outside of the three-phase separator.

22. The three-phase separator according to 1, wherein said first separator includes at least two plate block assemblies each of which includes four of said first plate block, each of said first plate block includes a plurality of side surfaces, at least one of said plurality of side surfaces of each first plate block adjoining a respective one of said plurality of side surfaces of another said first plate block, said plurality of side surfaces being two said side surfaces, each said first plate block of each of said plate block assemblies together forming two first plate block packs such that two of said first plate blocks together form one said first plate block pack and two others of said first plate blocks form another said first plate block pack, each said first plate block pack being formed by one said side surface of each respective one of two said first plate blocks adjoining each other at an angle of inclination of 10° to 80° relative to a longitudinal direction of a respective said first plate block, said first separator further including two walls, said first plate block packs being connected to one another via said walls connecting respective ones of said side surfaces together so that said four first plate blocks and said two walls, as seen from a cross-section of the three-phase separator, are arranged in a form of a hexagon.

23. The three-phase separator according to 22, wherein said first separator includes at least four said plate block assemblies.

24. The three-phase separator according to claim 1, wherein each of said mutually parallel first plates includes an upper end, said inlet region for the three-phase mixture being formed by each said upper end.

25. The three-phase separator according to claim 1, wherein said second separator has one second plate block.

26. The three-phase separator according to claim 1, wherein said at least one second plate block of said second separator adjoins said at least one first plate block of said first separator.

27. The three-phase separator according to claim 26, wherein said at least one first plate block includes at least two of said first plate block, said at least one second plate block of said second separator being arranged between and adjoining said at least two first plate blocks of said first separator.

28. The three-phase separator according to claim 27, wherein said first separator includes four of said first plate block each of which includes a plurality of side surfaces, said plurality of side surfaces being two said side surfaces, each of said two side surfaces of each said first plate block adjoining a respective one of said side surfaces of another said first plate block so that each said first plate block, as seen from a cross-section of the three-phase separator, are arranged in a form of a lozenge, said second separator having one second plate block which, as seen from said cross-section of the three-phase separator, is arranged in a middle of said lozenge formed by said four first plate blocks of said first separator.

29. The three-phase separator according to claim 27, wherein said first separator includes four of said first plate block each of which includes a plurality of side surfaces, said plurality of side surfaces being two said side surfaces, said four first plate blocks together forming two first plate block packs such that two of said first plate blocks together form one said first plate block pack and two others of said first plate blocks form another said first plate block pack, each said first plate block pack being formed by one said side surface of each respective one of two said first plate blocks adjoining each other at an angle of inclination of 10° to 80° relative to a longitudinal direction of a respective said first plate block, said first separator further including two walls, said first plate block packs being connected to one another via said walls connecting respective ones of said side surfaces together so that said four first plate blocks and said two walls, as seen from a cross-section of the three-phase separator, are arranged in a form of a hexagon, said second separator having one second plate block which, as seen from said cross-section of the three-phase separator, is arranged in a middle of said hexagon formed by said four first plate blocks and said two walls of said first separator.

30. The three-phase separator according to claim 26, further including an intermediate wall between said at least one second plate block of said second separator and said at least one first plate block adjacent thereto and belonging to said first separator, said intermediate wall, as seen from said vertical, projecting beyond an upper end of said first separator.

31. The three-phase separator according to claim 30, wherein said intermediate wall, as seen from a longitudinal axis of the three-phase separator, is an innermost plate of said first plate block that belongs to said first separator and adjoins said second plate block, said innermost plate being higher than each remaining one of said mutually parallel first plates of a same said first plate block.

32. The three-phase separator according to claim 1, wherein said outlet for the liquid is arranged above an upper end of said at least one second plate block of said second separator.

33. The three-phase separator according to claim 32, wherein said first separator includes at least two of said first plate block each of which includes an outermost plate of said mutually parallel first plates, each said outermost plate including a lower end, the three-phase separator further including a plurality of outer walls each of which is at said lower end of each said outermost plate of each said at least two first plate blocks of said first separator, as seen from a longitudinal axis of the three-phase separator.

34. The three-phase separator according to claim 33, wherein at least two of said plurality of outer walls, as seen from said longitudinal axis of the three-phase separator, are angled down and inwardly, so that said plurality of outer walls, as seen from said vertical, run together downward, forming a throat.

35. The three-phase separator according to claim 34, wherein said plurality of outer walls forming said throat run at an angle to each other from 30° to 120°.

36. The three-phase separator according to claim 35, wherein said angle is from 40° to 100°.

37. The three-phase separator according to claim 35, wherein said angle is from 60° to 80°.

38. The three-phase separator (10) according to claim 35, wherein said angle is 70°.

39. The three-phase separator according to claim 34, wherein said outlet for said fraction rich in the plurality of solids is provided on said throat.

40. The three-phase separator according to claim 39, wherein said outlet is constructed in a form of a slot running parallel to said throat.

41. The three-phase separator according to claim 39, further including a baffle underneath said outlet, said baffle being configured in such a way that no liquid, gas, or solids flowing vertically upward from underneath the three-phase separator can enter said outlet through said outlet.

42. A reactor, comprising:
an upper region; and
a three-phase separator in said upper region, said three-phase separator being for separating a gas and a plurality of solids from a three-phase mixture containing a liquid, the gas, and the plurality of solids, said three-phase separator including:
an inlet region for the three-phase mixture;
an outlet for a fraction rich in the plurality of solids;
an outlet for the liquid;
a first separator for separating the gas from the three-phase mixture and thereby for forming a two-phase mixture which contains the liquid and the plurality of solids, said first separator one of forming said inlet region for the three-phase mixture and being connected to said inlet region for the three-phase mixture, said first separator including at least one first plate block each having at least two first flow channels and at least three mutually parallel first plates between which a respective one of said at least two first flow channels is formed in each case, said first separator being configured such that the three-phase mixture entering through said inlet region is led from a top of said first separator to a bottom of said first separator in said at least two first flow channels, relative to a vertical; and
a second separator for separating the plurality of solids from said two-phase mixture formed in said first separator, said second separator including at least one second plate block each having at least two second flow channels and at least three mutually parallel second plates between which a respective one of said at least two second flow channels is formed in each case, said second separator being configured and arranged in relation to said first separator such that said two-phase mixture emerging from said first separator enters said at least two second flow channels of said second separator from below, relative to said vertical, and is led upward in said at least two second flow channels, the three-phase separator being configured in such a way that the three-phase mixture can enter said first separator of the three-phase separator only via said inlet region.

43. The reactor according to claim 42, wherein the reactor is one of an anaerobic reactor and an aerobic reactor for purifying one of effluent and process water, the reactor including at least one feed line for feeding one of said effluent and said process water to be purified into the reactor and at least one discharge line for discharging one of a purified effluent and a purified process water from the reactor.

44. The reactor according to claim 43, wherein the reactor is one of said anaerobic reactor and said aerobic reactor for continuously purifying one of said effluent and said process water in a paper industry.

45. A process for separating a gas and a plurality of solids from a three-phase mixture containing a liquid, the gas, and the plurality of solids, said process comprising the steps of:
  a) introducing the three-phase mixture via an inlet region into a first separator of a three-phase separator, said first separator one of forming said inlet region for the three-phase mixture and being connected to said inlet region for the three-phase mixture, said first separator including at least one first plate block each having at least two first flow channels and at least three mutually parallel first plates between which a respective one of said at least two first flow channels is formed in each case;
  b) leading the three-phase mixture from a top of said first separator to a bottom of said first separator through said at least two first flow channels of said first separator, in relation to a vertical, in order to separate the gas from the three-phase mixture, forming a two-phase mixture;
  c) extracting said two-phase mixture from said first separator;
  d) introducing at least a portion of said two-phase mixture into a second separator, said second separator including at least one second plate block each having at least two second flow channels and at least three mutually parallel second plates between which a respective one of said at least two second flow channels is formed in each case;
  e) leading said two-phase mixture from a bottom of said second separator to a top of said second separator through said at least two second flow channels of said second separator, in relation to said vertical, in order to separate the plurality of solids from said two-phase mixture and thereby form a purified liquid and a fraction rich in the plurality of solids;
  f) discharging said purified liquid from said second separator; and
  g) discharging said fraction rich in the plurality of solids from said three-phase separator through an outlet of said three-phase separator, only said two-phase mixture being discharged from said first separator but no three-phase mixture being introduced into said second separator.

46. The process according to claim 45, wherein the process is carried out in said three-phase separator which includes:
  said inlet region for the three-phase mixture;
  said outlet for said fraction rich in the plurality of solids;
  an outlet for the liquid;
  said first separator for separating the gas from the three-phase mixture and thereby for forming the two-phase mixture which contains the liquid and the plurality of solids; and
  said second separator for separating the plurality of solids from said two-phase mixture formed in said first separator, said second separator being configured and arranged in relation to said first separator such that said two-phase mixture emerging from said first separator enters said at least two second flow channels of said second separator from below, relative to said vertical, and is led upward in said at least two second flow channels, the three-phase separator being configured in such a way that the three-phase mixture can enter said first separator of the three-phase separator only via said inlet region.

47. The process according to claim 45, wherein the process is operated in such a way and an area of said three-phase separator associated with said outlet from said three-phase separator for said fraction rich in the plurality of solids is dimensioned in such a way that an entry velocity of the three-phase mixture into said inlet region of said first separator is lower than a rate of rise of a plurality of gas bubbles in the three-phase mixture.

\* \* \* \* \*